(12) United States Patent
Carrico et al.

(10) Patent No.: US 8,386,092 B1
(45) Date of Patent: Feb. 26, 2013

(54) HOLD LINE AWARENESS USING TACTILE DEVICES

(75) Inventors: Matthew J. Carrico, Mount Vernon, IA (US); Maureen A. Lehman, Cedar Rapids, IA (US)

(73) Assignee: Rockwell Collins, Inc., Cedar Rapids, IA (US)

( * ) Notice: Subject to any disclaimer, the term of this patent is extended or adjusted under 35 U.S.C. 154(b) by 1085 days.

(21) Appl. No.: 12/231,388

(22) Filed: Sep. 2, 2008

(51) Int. Cl.
*G06F 17/00* (2006.01)
*G05D 1/02* (2006.01)
*G05D 3/12* (2006.01)
*G08B 21/00* (2006.01)
*B64C 13/00* (2006.01)

(52) U.S. Cl. ............... 701/3; 701/11; 701/45; 701/120; 340/945; 340/965; 340/972; 340/988

(58) Field of Classification Search ................ 701/1, 3, 701/120, 200, 207, 208, 213, 300, 4, 11, 701/14, 36, 45, 49, 116, 400, 408, 409, 431, 701/435, 466, 467, 468, 538; 340/945, 965, 340/972, 988, 979; 244/75.1, 76 R, 175
See application file for complete search history.

(56) References Cited

U.S. PATENT DOCUMENTS

| | | | |
|---|---|---|---|
| 5,867,804 A * | 2/1999 | Pilley et al. | 701/120 |
| 6,182,005 B1 * | 1/2001 | Pilley et al. | 701/120 |
| 6,606,563 B2 | 8/2003 | Corcoran, III | |
| 6,937,165 B2 | 8/2005 | Rogers | |
| 7,363,145 B2 | 4/2008 | Conner | |
| 2003/0033084 A1 * | 2/2003 | Corcoran, III | 701/301 |
| 2006/0259232 A1 * | 11/2006 | Huthoefer et al. | 701/120 |
| 2007/0241935 A1 | 10/2007 | Pepitone | |
| 2008/0140269 A1 * | 6/2008 | Naimer et al. | 701/7 |
| 2009/0115637 A1 * | 5/2009 | Naimer et al. | 340/979 |

* cited by examiner

*Primary Examiner* — Thomas Tarcza
*Assistant Examiner* — Edward Pipala
(74) *Attorney, Agent, or Firm* — Donna P. Suchy; Daniel M. Barbieri

(57) ABSTRACT

A hold line awareness system for alerting an occupant of an aircraft that the aircraft is approaching a hold line at an airport. In one broad aspect the invention includes an airport database located on an aircraft. The airport database is configured to store location information for a plurality of hold lines at the airport. A positioning system is located on the aircraft. The positioning system is configured to determine the aircraft location. A processor is located on the aircraft and is operatively connected to the airport database and the positioning system. The processor is configured to calculate the distance between the aircraft location and a hold line and provide a processor alerting output signal if the distance is less than a predetermined value. A sensory effector is located on the aircraft and operatively connected to the processor for receiving the processor alerting output signal and providing a tactile alert to an occupant in response thereto. In another broad aspect, a real time feature detecting system is utilized instead of the airport database. The feature detecting system is configured to detect features defining a plurality of hold lines at the airport and for determining the distance of the aircraft from a detected hold line.

15 Claims, 3 Drawing Sheets

HOLD LINE AWARENESS USING TACTILE DEVICES

BACKGROUND OF THE INVENTION

1. Field of the Invention

The present invention relates generally to systems for alerting an occupant of an aircraft that the aircraft is approaching a particular area of an airport and more particularly to an awareness system for providing a tactile alert to the aircraft occupant when the aircraft is approaching a hold line.

2. Description of the Related Art

A runway incursion may be defined as "any occurrence at an airport involving an aircraft, vehicle, person or object on the ground that creates a collision hazard or results in loss of separation with an aircraft taking off, intending to take off, landing or intending to land."

One such incursion scenario is that of the aircraft traveling beyond a hold line without ATC clearance. Causes for this event vary, but research indicates that causal factors are inadequate navigation awareness including confusion signage as well as excessive operational demands.

This results in lack of local awareness or visually missing local cues for guidance. This will often lead to missing turns or navigating the aircraft beyond a hold line without proper clearance.

Some systems use an aural or visual warning when a hold line has been crossed, adding to the audio clutter in the flight deck. For example, U.S. Pat. No. 6,606,563, entitled Incursion Alerting System, discloses a system for alerting the occupant of a vehicle that the vehicle is in or approaching a zone of awareness. For instance, the system may be used to alert the pilot or flight crew of an aircraft that the aircraft is on or approaching a runway, and may identify the specific runway. Thus, the invention also provides a method of reducing unintentional incursions of taxiing aircraft onto runways. The system generally includes a storage device or memory, a positioning system such as a GPS that typically repeatedly determines the location of the vehicle, an alerting device such as an alarm or display, and a processor, all of which are typically located on the vehicle. The processor typically compares the location of the vehicle with stored location information for various zones of awareness and initiates an alert when appropriate. The processor may take into consideration the velocity and direction of travel of the vehicle. Zones of awareness may be defined by coordinates, such as the end points of line segments. Audible alarms may include a voice warning, and may be able to be silenced until the vehicle leaves the zone of awareness. On aircraft, the system may reference the centerline of the runway, for example, alerting when the aircraft is within 150 feet of the centerline. The system may be disabled when the aircraft is in flight.

Presently, rumble strips are often used to alert automobile drivers of an impending stop or that his vehicle is drifting off a road. Such rumble strips may be a series of textured grooves in the road that cause an automobile to vibrate and its tires to emit a "rumbling" sound as it passes over the strip. This vibration and sound alert the driver that the vehicle is close to the stop or has deviated from the road and the driver may then correct the motion of the vehicle.

U.S. Pat. No. 6,937,165, entitled "Virtual Rumble Strip", discloses a system for a virtual rumble strip that uses a 3-dimensional audio alert (3-DAA) signal to warn a user operating a vehicle that the vehicle has deviated from a predetermined path. The virtual rumble strip may include a sensor that detects location data for the vehicle, and an alerting mechanism that receives the location data from the sensor. The alerting mechanism may include an audio processing unit that uses the location data and a Head-Related Transfer Function to create the 3-DAA signal. A speaker may then play the 3-DAA signal, which the user may interpret as originating from the direction of the deviation. The user may then respond to the 3-DAA signal by correcting the motion of the vehicle. The alerting mechanism may include a tactile processing unit in communication with a tactile actuator. The tactile processing unit may generate a tactile signal that is sent to the tactile actuator. The tactile actuator may be an electromechanical device that converts the tactile signal into a mechanical movement, such as a vibration.

U.S. Pat. No. 7,363,145, entitled "Ground Operations and Imminent Landing Runway Selection", discloses a method, computer program product and apparatus for locating aircraft with respect to airport runways, generating and annunciating imminent landing situational awareness advisories as a function of aircraft height above runway.

U.S. Pub. No. 20070241935, entitled "Runway and Taxiway Turning Guidance", discloses according to an example embodiment, a method that includes receiving data about an aircraft that is moving on a surface using at least a first wheel, the data descriptive of physical characteristics of the aircraft, calculating a first path of the first wheel along the surface using the data, and displaying the first path in relation to a boundary between a first area of the surface and a second area of the surface, the first area safe for the aircraft, the second area unsafe for the aircraft.

The aforementioned prior art focuses on aural alerting which increases audio clutter in the flight deck. Additionally, the prior art does not address that in a high work load environment, there is a potential loss of awareness of local visual cues for impending hold operations.

SUMMARY OF THE INVENTION

In a first broad aspect, the hold line awareness system for alerting an occupant of an aircraft that the aircraft is approaching a hold line at an airport includes an airport database located on an aircraft. The airport database is configured to store location information for a plurality of hold lines at the airport. A positioning system is located on the aircraft. The positioning system is configured to determine the aircraft location. A processor is located on the aircraft and is operatively connected to the airport database and the positioning system. The processor is configured to calculate the distance between the aircraft location and a hold line and provide a processor alerting output signal if the distance is less than a predetermined value. A sensory effector is located on the aircraft and operatively connected to the processor for receiving the processor alerting output signal and providing a tactile alert to an occupant in response thereto.

The sensory effector may be, for example, a stick shaker, a device located in the seat or armrest of the aircraft, or a yoke.

As used herein the term "hold line" is meant to broadly refer to a position on an airport surface that requires clearance to proceed. Examples include: runway holds, Instrument Landing System (ILS) holds, taxiway intersection holds, airport surface movement holds such as ramp holds and parking area holds.

In another broad aspect, the hold line awareness system includes a real time feature detecting system. The feature detecting system is configured to detect features defining a plurality of hold lines at the airport and for determining the distance of the aircraft from a detected hold line. A processor is operatively connected to the real time feature detecting system. The processor is configured to provide a processor alerting output signal if the distance is less than a predetermined value.

The present invention solves the problem of audio clutter in the flight deck by providing tactile feedback to the pilot when approaching a hold line.

The "virtual rumble strip" disclosed in U.S. Pat. No. 6,937,165, discussed above, involves conformance to a road and center line to remind a person as to when the vehicle is deviating from it. The present invention, on the other hand, alerts the pilot to an on-path event that does require operator awareness and may require operator action if permission to proceed has not been received.

DETAILED DESCRIPTION OF THE INVENTION

Figure 1:
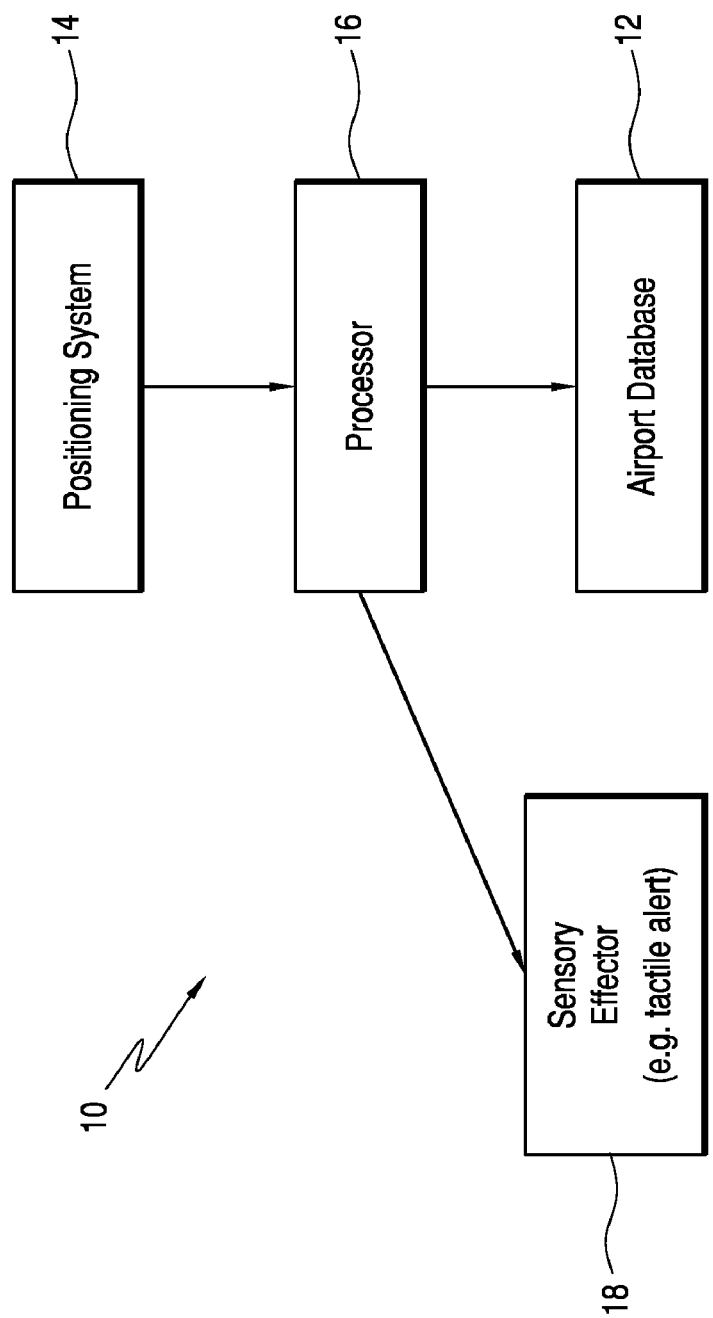
FIG. 1 is a schematic illustration of a first embodiment of the hold line awareness system of the present invention that utilizes an airport database system.

Referring now to the drawings and the characters of reference marked thereon, FIG. 1 illustrates a first embodiment of the hold line awareness system of the present invention, designated generally as 10. The hold line awareness system 10 includes an airport database 12 located on an aircraft. The airport database 12 is configured to store location information for a plurality of hold lines at the airport. The airport database 12 may be a typical database used such as defined by the ARINC 816.

The system 10 includes a positioning system 14 located on the aircraft. The positioning system 14 is configured to determine the aircraft location. It may be, for example, a NAV sensor for a global positioning system (GPS) or other satellite positioning system. A processor 16 is located on the aircraft and is operatively connected to the airport database 12 and the positioning system 14. The processor 16 is configured to calculate the distance between the aircraft location and a hold line. The processor 16 provides a processor alerting output signal if that distance is less than a predetermined value. The processor 16 may be a general purpose processor qualified for aviation use.

A sensory effector 18 is located on the aircraft and is operatively connected to the processor 16 for receiving the processor alerting output signal and providing a tactile alert to an occupant in response thereto. The sensory effector 18 may be, for example, a stick shaker, a device located in the seat or armrest of the aircraft, or a yoke.

Figure 2:
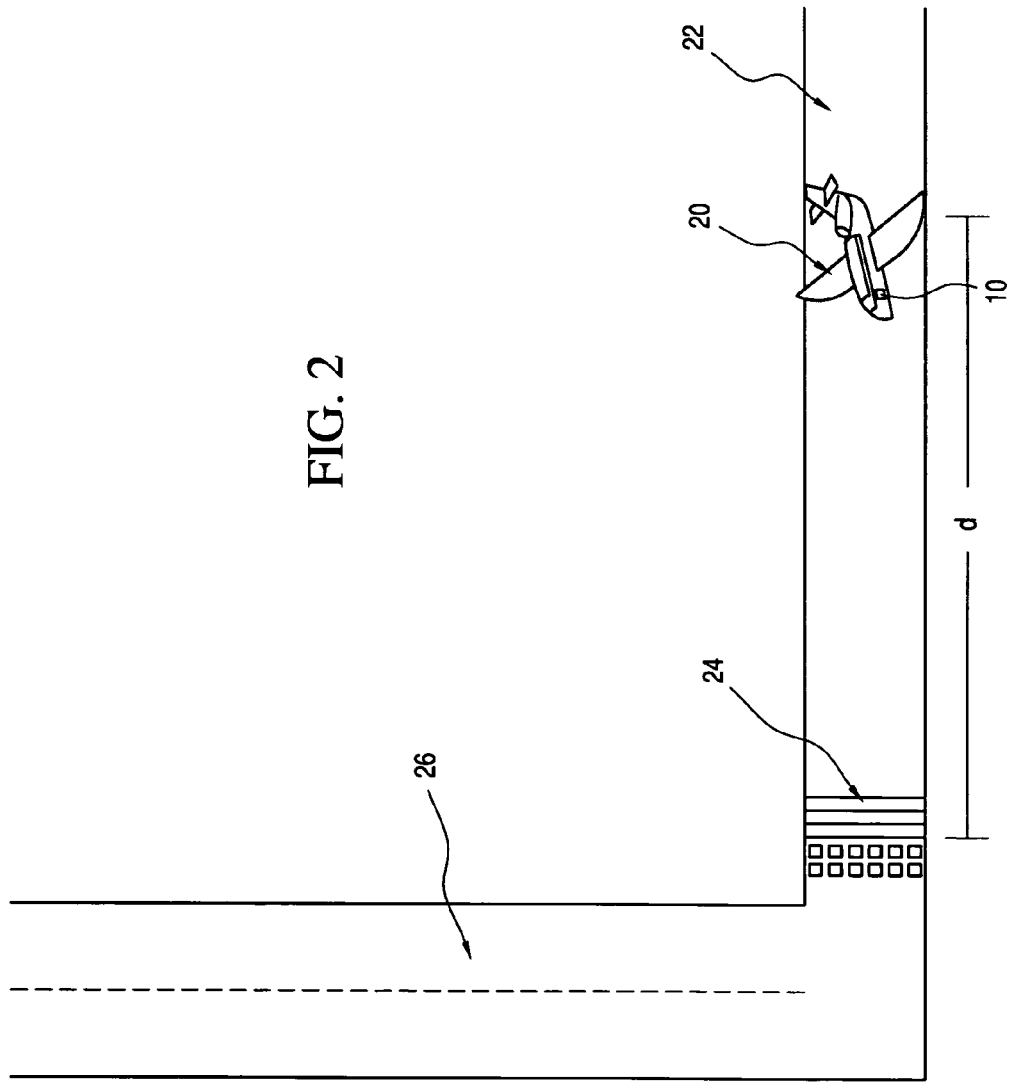
FIG. 2 is a schematic illustration showing utilization of the hold line awareness system in an airport.

Referring now to FIG. 2, utilization of the hold line awareness system 10 is illustrated in an airport environment. As the aircraft 20 on a taxiway 22 approaches a detected hold line 24 for a runway 26, the distance, d, to the hold line is determined. If d is less than a predetermined value a tactile alert is provided to the occupant. A typical value of d for a hold is 50-100 feet.

Figure 3:
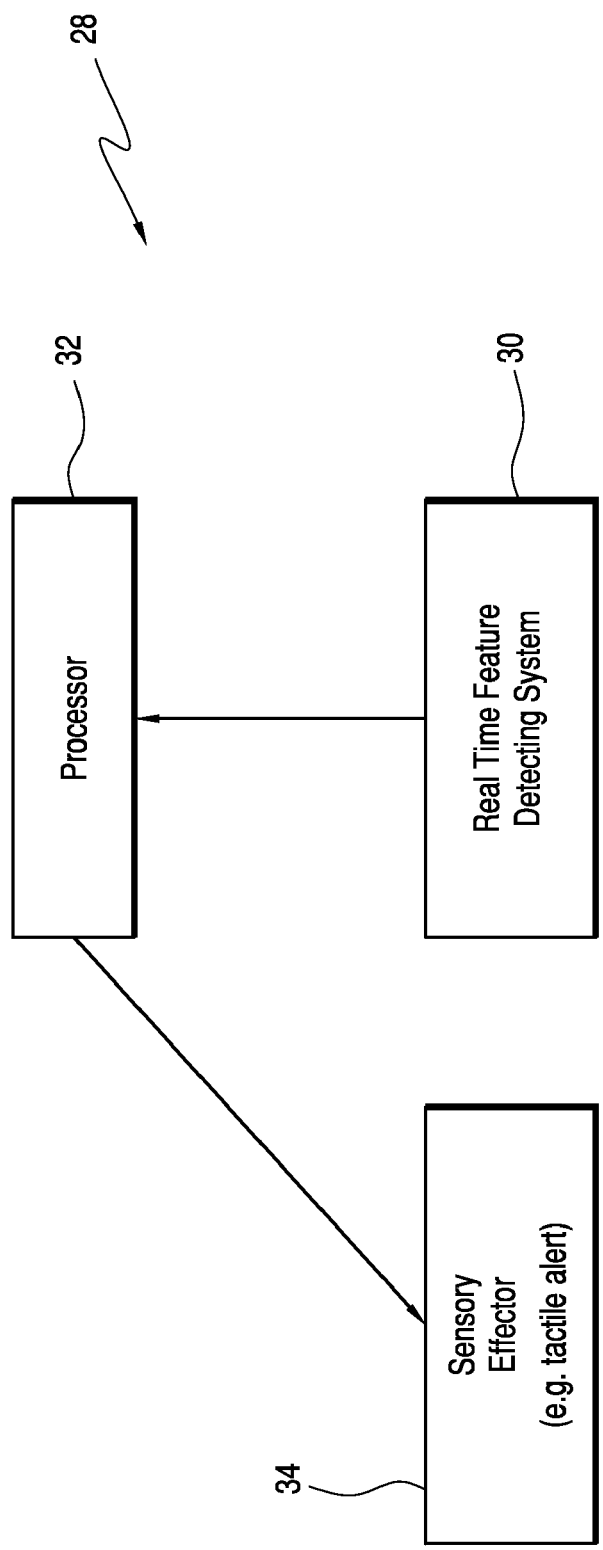
FIG. 3 is a schematic illustration of a second embodiment of the hold line awareness system of the present invention that utilizes a real time feature detecting system.

Referring now to FIG. 3, another embodiment of the hold line awareness system of the present invention is illustrated, designated generally as 28. In this embodiment, the hold line awareness system 30 includes a real time feature detecting system 30 located on an aircraft. The feature detecting system is configured to detect features defining a plurality of hold lines at the airport and for determining the distance of the aircraft from a detected hold line. The real time feature detecting system 30 may be, for example, an optical sensing system such as a visual surveillance camera coupled with feature recognition software.

A processor 32 is located on the aircraft and is operatively connected to the real time feature detecting system 30. The processor 32 is configured to provide a processor alerting output signal if the distance is less than a predetermined value. A sensory effector 34 is located on the aircraft and operatively connected to the processor for receiving the processor alerting output signal and providing a tactile alert to an occupant in response thereto.

Additionally, technology exists to display high resolution surface maps as a moving map display in the flight deck. Data represented includes runways, taxiways and location of hold lines. If such a system were present in the flight deck, the present invention could provide information to the display system to indicate which hold was activating the alert.

Other embodiments and configurations may be devised without departing from the spirit of the invention and the scope of the appended claims.

The invention claimed is:

1. A hold line awareness system for alerting an occupant of an aircraft on the ground that the aircraft is approaching a hold line at an airport, comprising:
    a) an airport database located on an aircraft, said airport database being configured to store location information for a plurality of hold lines at the airport;
    b) a positioning system located on the aircraft, said positioning system being configured to determine the aircraft location;
    c) a processor located on the aircraft and being operatively connected to said airport database and said positioning system, said processor being configured to calculate the distance between the aircraft location and a hold line and provide a processor alerting output signal if said distance is less than a predetermined value; and,
    d) a sensory effector located on said aircraft and operatively connected to said processor for receiving said processor alerting output signal and providing a tactile alert to an occupant in response thereto.

2. The hold line awareness system of claim 1 wherein said positioning system comprises a NAV sensor.

3. The hold line awareness system of claim 1 wherein said sensory effector comprises a stick shaker.

4. The hold line awareness system of claim 1 wherein said sensory effector comprises a device located in the seat or armrest of the aircraft.

5. The hold line awareness system of claim 1 wherein said sensory effector comprises a yoke.

6. A hold line awareness system for alerting an occupant of an aircraft on the ground that the aircraft is approaching a hold line at an airport, comprising:
    a) a real time feature detecting system located on an aircraft, said feature detecting system being configured to detect features defining a plurality of hold lines at the airport and for determining the distance of the aircraft from a detected hold line;
    b) a processor located on the aircraft and being operatively connected to said real time feature detecting system, said processor being configured to provide a processor alerting output signal if said distance is less than a predetermined value; and,
    c) a sensory effector located on said aircraft and operatively connected to said processor for receiving said processor alerting output signal and providing a tactile alert to an occupant in response thereto.

7. The hold line awareness system of claim 6 wherein said sensory effector comprises a stick shaker.

8. The hold line awareness system of claim 6 wherein said sensory effector comprises a device located in the seat or armrest of the aircraft.

9. The hold line awareness system of claim 6 wherein said sensory effector comprises a yoke.

10. The hold line awareness system of claim 6 wherein said real time feature detecting system comprises an optical sensing system.

11. A method for alerting an occupant of an aircraft on the ground that the aircraft is approaching a hold line at an airport, comprising:
   a) providing an airport database, said airport database being configured to store location information for a plurality of hold lines at the airport;
   b) determining aircraft location utilizing a positioning system located on the aircraft;
   c) utilizing a processor located on the aircraft and being operatively connected to said airport database and said positioning system, said processor being configured to calculate the distance between the aircraft location and a hold line and provide a processor alerting output signal if said distance is less than a predetermined value; and,
   d) providing a tactile alert to an occupant of an aircraft in response to said processing alerting output signal utilizing a sensory effector located on said aircraft and operatively connected to said processor.

12. The method of claim 11 wherein said step of utilizing a positioning system comprises the step of using a NAV sensor.

13. The method of claim 11 wherein said step of utilizing a sensory effector comprises the step of using a stick shaker.

14. The method of claim 11 wherein said step of utilizing a sensory effector comprises the step of using a device located in the seat or armrest of the aircraft.

15. The method of claim 11 wherein said step of utilizing a sensory effector comprises the step of using a yoke.

* * * * *